Feb. 10, 1953  A. N. GRAY  2,628,204
METHOD OF AND APPARATUS FOR MIXING MATERIALS
Filed May 13, 1950
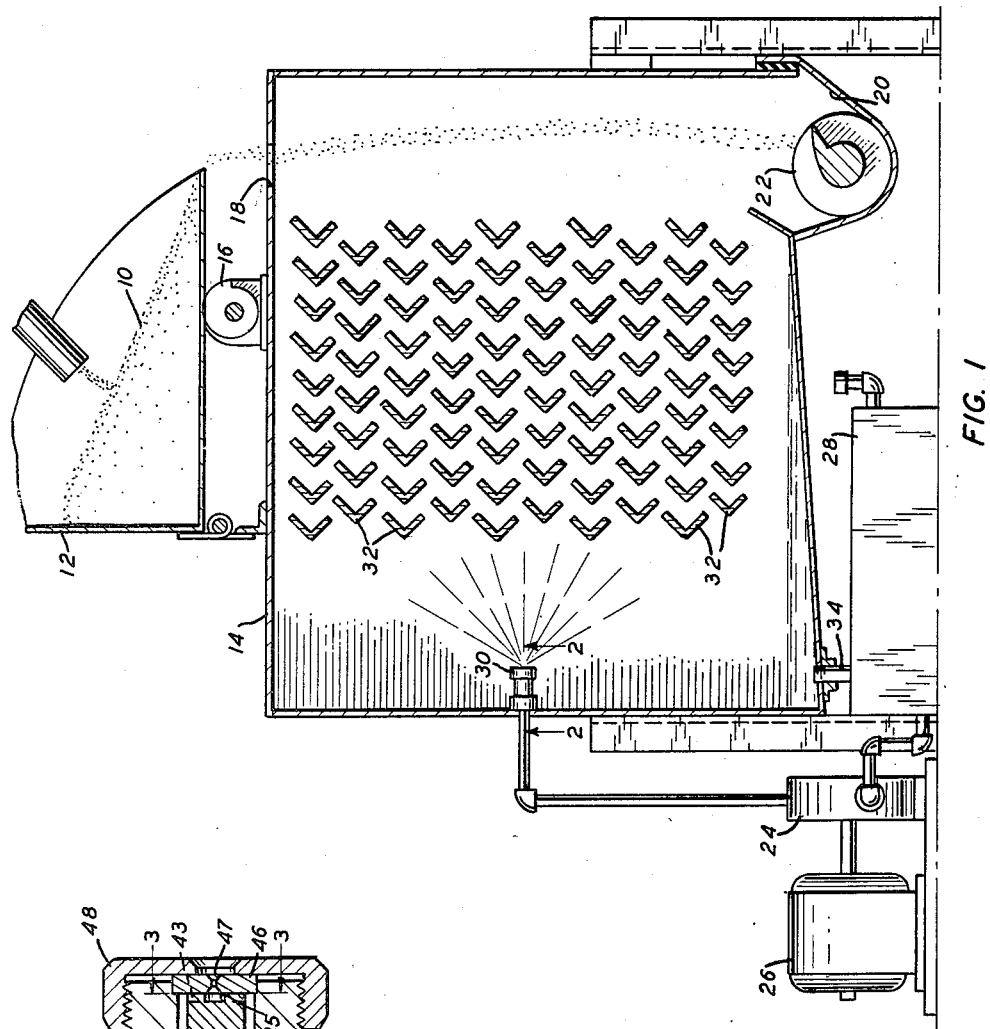
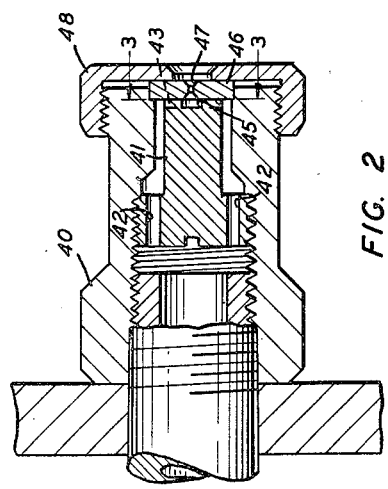
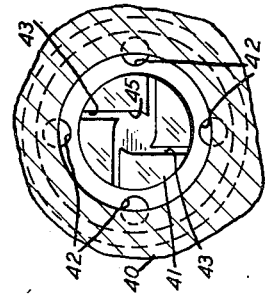
INVENTOR
A. N. GRAY
BY
ATTORNEY Patented Feb. 10, 1953

2,628,204

UNITED STATES PATENT OFFICE 2,628,204

METHOD OF AND APPARATUS FOR MIXING MATERIALS

Alvin N. Gray, Edgewood, Md., assignor to Western Electric Company, Incorporated, New York, N. Y., a corporation of New York Application May 13, 1950, Serial No. 161,819

8 Claims. (Cl. 260—29.1)

This invention relates to methods of and apparatus for mixing materials, and more particularly to methods of and apparatus for applying plasticizing liquids to organic, plastic material.

Mixing material, such as for example, in mixing liquid plasticizing material with an organic, plastic material, it is essential that the materials are thoroughly and uniformly dispersed one with another. In the past, to apply a liquid plasticizer to a mass of comminuted organic, plastic material, it has been necessary to use heavy mixing apparatus to thoroughly disperse the plasticizer in the plastic material. Such mixing apparatus is heavy, expensive both in initial cost and in cost of operation and requires excess plasticizer to insure that all portions of the organic plastic material receive sufficient quantity of plasticizer.

An object of the invention is to provide new and improved methods of and apparatus for mixing materials.

A further object of the invention is to provide new and improved methods of and apparatus for mixing liquid plasticizers with organic, plastic material.

A method illustrating certain features of the invention may include creating a fog of one material in a chamber, and projecting another material through the chamber.

An apparatus illustrating certain features of the invention may include a chamber, means for projecting a material through the chamber, and means for creating a fog of a second material in the chamber.

A complete understanding of the invention may be obtained from the following detailed description of a method and apparatus forming specific embodiments thereof, when read in conjunction with the appended drawing, in which:

Fig. 1 is a fragmentary, vertical section of an apparatus forming one embodiment of the invention;

Fig. 2 is an enlarged, fragmentary, sectional view of a portion of the apparatus shown in Fig. 1, and Fig. 3 is an enlarged, fragmentary, vertical section taken along line 3—3 of Fig. 2.

Referring now in detail to the drawing, comminuted material 10, such as, for example, polyvinyl chloride, is fed continuously into a scoop 12 hinged to a chamber 14 and vibrated by a cam 16 which is driven at a high rate of speed. The material 10 is continuously vibrated off of the scoop 12 at a uniform rate of speed and falls in a vertical curtain through a slot 18 formed in the top of the chamber 14 into a conveyer trough 20 formed at the bottom of the chamber 14, and a screw 22 continuously carries away the material 10 as it falls into the trough 20.

A pump 24 driven by an electric motor 26 pumps a liquid, such as, for example, the plasticizer tricresyl phosphate, from a supply tank 28 through an atomizing nozzle 30 of a well known type, which discharges the liquid in a fine fog or mist by mechanically induced pressure rather than by pressure induced pneumatically. The fog of the liquid flows through baffles 32—32 which precipitate the heavy particles of the fog so that these particles do not reach the curtain formed by the plastic material. The fine particles of the liquid flow on through the baffles 32—32 envelop and penetrate the curtain of material, soak into the material and are thoroughly mixed therewith. The heavier particles of the liquid which have been precipitated by the baffles 32—32 drop from the baffles onto the bottom of the chamber 14 and flow through a drain 34 into the supply tank 28.

The nozzle includes a tubular housing 40 enclosing an insert 41 having longitudinal passages 42—42 and transverse passages 43—43. The transverse passages lead tangentially into a bore 45 to turbulate the liquid, and a disc 46 having a turbulating orifice 47 is locked on the end of the insert by a cap 48. The liquid is forced through the nozzle by hydraulic pressure thereon, and the transverse passages 43—43, the bore 45 and the orifice 47 create such a turbulence that the liquid emerges from the nozzle as a mist composed of very fine particles of liquid.

The above-described method of and apparatus for mixing materials serves to thoroughly mix the liquid with the material 10 with a minimum amount of liquid per unit quantity of the material. The apparatus is simple and inexpensive both in initial cost and cost of operation.

The above-described method and apparatus may be used to mix other materials than a liquid and a solid. For example, a powder could be sprayed into a liquid curtain or a solid curtain, and a liquid could be sprayed into a liquid curtain.

What is claimed is:

1. A method of mixing plasticizing materials with thermoplastic materials, which includes continuously dropping a powdered thermoplastic material in a sheet-like curtain, and forcing a liquid plasticizer material through a baffled passageway in finely divided, air-suspended form onto the curtain of the first-mentioned material to mix the two materials.

2. A method of mixing plasticizing materials with thermoplastic materials, which includes dropping powdered thermoplastic material to be mixed with a liquid plasticizer along a sheet-like path, gently forcing a fog of the liquid toward the powdered material, and removing large droplets from the fog before it reaches the path of the thermoplastic material.

3. The method of plasticizing powdered thermoplastic material, which comprises continuously advancing powdered thermoplastic material along a sheet-like path, creating a fog of predominantly finely divided droplets of a liquid plasticizer, removing the heavier droplets from the fog, and causing the fog to contact the thermoplastic material as it progresses along said path to apply the plasticizer uniformly to the thermoplastic material.

4. The method of plasticizing powdered thermoplastic material, which comprises continuously dropping powdered thermoplastic material in the form of a curtain, urging a fog of a liquid plasticizer toward the path of the material, and precipitating large droplets of the plasticizer before they reach the material.

5. An apparatus for plasticizing thermoplastic material, which comprises means for forcing a powdered thermoplastic material along a predetermined, thin, sheet-like path, means for creating a mist of a liquid plasticizer and for forcing the mist continuously towards the sheet-like path of the thermoplastic material to coat that material uniformly with the plasticizer, and a baffle positioned adjacent to the sheet-like path for preventing large droplets of the liquid from contacting the powdered thermoplastic material in the path.

6. An apparatus for plasticizing thermoplastic material, which comprises a chamber having a slot in the upper portion thereof, means for dropping powdered thermoplastic material along a sheet-like path from the slot, means for filling the chamber with a fog of liquid plasticizer, and a plurality of baffles positioned between the sheet-like path and the means for filling the chamber with the fog for preventing large droplets of the liquid plasticizer from reaching the falling thermoplastic material.

7. An apparatus for plasticizing thermoplastic material, which comprises a chamber having an elongated slot in the upper portion thereof, means for dropping powdered thermoplastic material along a sheet-like path from the slot, a conveyor positioned in the lower portion of the chamber and below the slot, means for impelling in the chamber a fog of liquid plasticizer toward the path, and means for precipitating the larger particles of the fog.

8. An apparatus for applying a liquid plasticizer to particles of a powdered thermoplastic material, which comprises a chamber having an elongated slot in the upper portion thereof, a vibratory container positioned above the slot for continuously feeding powdered thermoplastic material into the chamber through the slot in the form of a vertical falling curtain, an atomizing nozzle positioned within the chamber and directed toward the curtain of thermoplastic material, means for supplying a liquid plasticizing material under pressure to the nozzle whereby the liquid is converted into the form of a mist and is urged toward the curtain whereby the particles of thermoplastic material are coated with the plasticizer, a plurality of baffles positioned at spaced points between the top and the bottom of the chamber and interposed between the nozzle and the curtain for preventing large droplets of liquid in the mist from contacting the powdered thermoplastic material in the curtain, and a conveyor positioned in the lower portion of the chamber for conveying the coated thermoplastic material from the chamber.

ALVIN N. GRAY.

REFERENCES CITED

The following references are of record in the file of this patent:

UNITED STATES PATENTS

| Number | Name | Date |
|---|---|---|
| 269,742 | Taggart | Dec. 26, 1882 |
| 331,242 | Hyatt | Nov. 24, 1885 |
| 2,263,099 | Olson | Nov. 18, 1941 |
| 2,349,944 | Dixon | May 30, 1944 |